US009992659B1

(12) United States Patent
Amireddy et al.

(10) Patent No.: US 9,992,659 B1
(45) Date of Patent: Jun. 5, 2018

(54) STREAM-PROCESSING OF TELECOMMUNICATION EVENT RECORDS

(71) Applicant: Sprint Communications Company L.P., Overland Park, KS (US)

(72) Inventors: Sridhar R. Amireddy, Overland Park, KS (US); Carter W. Floyd, Overland Park, KS (US); Kenneth W. Samson, Belton, MO (US); Vincent E. Turnbaugh, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days. days.

(21) Appl. No.: 15/663,743

(22) Filed: Jul. 29, 2017

(51) Int. Cl.
*H04W 4/24* (2018.01)
*H04M 15/00* (2006.01)
*H04L 12/911* (2013.01)

(52) U.S. Cl.
CPC ............ *H04W 4/24* (2013.01); *H04L 47/822* (2013.01); *H04M 15/47* (2013.01); *H04M 15/64* (2013.01); *H04M 15/65* (2013.01); *H04M 2215/0148* (2013.01); *H04M 2215/32* (2013.01)

(58) Field of Classification Search
CPC ....... H04W 4/24; H04L 47/822; H04M 15/47; H04M 15/64; H04M 15/65; H04M 2215/0148; H04M 2215/32
See application file for complete search history.

(56) References Cited

U.S. PATENT DOCUMENTS

| 2016/0094722 A1* | 3/2016 | Sharma | H04M 15/65 455/406 |
| 2016/0127539 A1* | 5/2016 | Sharma | H04M 3/36 379/112.09 |
| 2017/0118353 A1* | 4/2017 | Gaur | H04M 15/61 |
| 2017/0366680 A1* | 12/2017 | Raleigh | H04M 15/80 |

* cited by examiner

*Primary Examiner* — Keith Fang (57) ABSTRACT

A method of real-time streaming telecommunication event records. The method comprises receiving event records by a collector component executing on a computer system, storing the event records in a messaging queue by the collector component, where the messaging queue is executed on the computer system, retrieving some of the event records from the messaging queue by a producer component executing on the computer system, where each of the retrieved event records are associated with a same on-going telecommunication activity, aggregating the event records associated with the same on-going telecommunication activity by the producer into a bundle, retrieving the bundle by a consumer component executing on the computer system, formatting the bundle by the consumer component into an aggregated data record, analyzing the aggregated data record based on a predefined fraud pattern by the consumer component, and generating a billing record by the consumer component based on the aggregated data record.

7 Claims, 5 Drawing Sheets

STREAM-PROCESSING OF TELECOMMUNICATION EVENT RECORDS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer systems may generate large flows of data. Different computers within the computer system may be used to implement architectural layers of a composite data flow, where the data may flow from a data source to a first layer, from the first layer to a second layer, from the second layer to other layers and ultimately to a final layer. Some of the layers may provide a message queuing function to decouple a lower layer from a higher layer, so the two layers need not synchronize to coordinate the flow of data. For example, a lower layer may push a message to the message queue, where the message comprises some data or information to be processed by a higher layer. The higher layer retrieves the message from the message queue when it is ready to process it. If the message queue is empty, the higher layer waits until another message is available. In this way the lower layer does not have to handshake with the higher layer to pass messages.

SUMMARY

In an embodiment, a method of real-time streaming telecommunication event records is disclosed. The method comprises receiving Diameter event records by a collector component executing on a computer system, where the event records are received from network elements of a telecommunication network and the event records comprise Rf-type Diameter event records and Ro-type Diameter records and storing the event records in a messaging queue by the collector component, where the messaging queue is executed on the computer system, where Rf-type Diameter event records are stored in queues dedicated to Rf-type Diameter event records and Ro-type Diameter records are stored in queues dedicated to Ro-type Diameter event records. The method further comprises retrieving some of the Rf-type Diameter event records from the messaging queue by a Rf-type producer component executing on the computer system, where each of the retrieved event records are associated with a same first on-going telecommunication activity and aggregating the event records associated with the same first on-going telecommunication activity by the Rf-type producer component into a first bundle. The method further comprises retrieving the first bundle by a first consumer component executing on the computer system, formatting the first bundle by the first consumer component into a first aggregated data record, analyzing the first aggregated data record based on a predefined fraud pattern by the first consumer component, generating a first billing record by the first consumer component based on the first aggregated data record, and archiving the first aggregated data record by the first consumer component in a data store. The method further comprises retrieving some of the Ro-type Diameter event records from the messaging queue by a Ro-type producer component executing on the computer system, where each of the retrieved event records are associated with a same second on-going telecommunication activity and aggregating the event records associated with the same second on-going telecommunication activity by the Ro-type producer component into a second bundle. The method further comprises retrieving the second bundle by a second consumer component executing on the computer system, formatting the second bundle by the second consumer component into a second aggregated data record, analyzing the second aggregated data record based on the predefined fraud pattern by the second consumer component, generating a second billing record by the second consumer component based on the second aggregated data record, and archiving the second aggregated data record by the second consumer component in the data store.

In another embodiment, a method of real-time streaming telecommunication event records is disclosed. The method comprises receiving event records by a collector component executing on a computer system, where the event records are received from network elements of a telecommunication network, storing the event records in a messaging queue by the collector component, where the messaging queue is executed on the computer system, retrieving some of the event records from the messaging queue by a producer component executing on the computer system, where each of the retrieved event records are associated with a same on-going telecommunication activity, and aggregating the event records associated with the same on-going telecommunication activity by the producer component into a bundle. The method further comprises retrieving the bundle by a consumer component executing on the computer system, formatting the bundle by the consumer component into an aggregated data record, analyzing the aggregated data record based on a predefined fraud pattern by the consumer component, generating a billing record by the consumer component based on the aggregated data record, and archiving the aggregated data record by the consumer component in a data store.

In yet another embodiment, a method of real-time streaming telecommunication event records is disclosed. The method comprises receiving Diameter event records by a collector component executing on a computer system, where the Diameter event records are received from network elements of a telecommunication network, storing the Diameter event records in a messaging queue by the collector component, where the messaging queue is executed on the computer system, retrieving some of the Diameter event records from the messaging queue by a producer component executing on the computer system, where each of the retrieved Diameter event records are associated with a same on-going telecommunication activity, and aggregating the Diameter event records associated with the same on-going telecommunication activity by the producer component into a bundle. The method further comprises retrieving the bundle by a consumer component executing on the computer system, formatting the bundle by the consumer component into an aggregated data record, analyzing the aggregated data record based on a predefined fraud pattern by the consumer component, based on the analysis, sending a fraud notification by the consumer component to a fraud administration component executing on the computer system, generating a billing record by the consumer component based on the aggregated data record, and archiving the aggregated data record by the consumer component in a data store.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a real-time telecommunication event record streaming system and methods. Various electronic devices in telecommunication networks generate a huge volume of events that are tracked and analyzed in a variety of ways. These devices comprise mobile phones, cell sites, switches, routers, and computers. Each single telephone call may generate multiple event records. Each single data call may generate multiple event records. Handling the huge flood of telecommunication event records efficiently is a severe and increasing technical challenge. In the past it may have been customary to collect telecommunication event records and process them later in a batch processing mode (i.e., in a non-real-time processing manner). This approach, however, undesirably delays fraud mitigation activities, in some instances delaying responding to an on-going fraud activity for several days. This approach may also involve picking up and handling the same data many times and making multiple copies of the same data stored in separate different places, wasting data storage resources and wasting time in picking up the data.

The present disclosure teaches that handling telecommunications event data in a real-time stream provides improved efficiency. Network elements (server computers) may receive telecommunication events from various sources and send them to a real-time event stream processing system. The system comprises a plurality of collector components. Each collector component receives an event record, identifies a type of the event record, and stores the event record on a messaging queue of the system that corresponds to the type of the event record. The system comprises a plurality of messaging queues. Different types of event records are stored on different messaging queues, each such messaging queue storing events associated with one single type of event record. It is understood that event records may be encapsulated in messages that are sent by the network elements to the system. Alternatively, the collector component may encapsulate received event records in messages.

The system further comprises a plurality of producer components. Each producer component is configured to work on a single type of event record and to retrieve messages for processing from one or more messaging queue associated with that type of event record. There may be multiple producer components associated with the same event record type. A producer component picks up messages from the messaging queue and partially processes the event records embedded in the messages. In particular, the producer component aggregates or bundles events records associated with the same on-going telecommunication activity. For example, a single voice call from a first mobile communication device to a second communication device may give rise to a plurality of event records. The producer component picks up, over time, all of those related event records and consolidates them or aggregates them into a single event bundle or aggregated data record. When the producer component deems the subject on-going telecommunication activity concluded, it places the event bundle on a different set of message queues—a set of message queues that contain event bundles. The producer components may provide other processing on event records and event bundles such as validating the event records, transforming the event records in various ways.

The system further comprises a plurality of consumer components. A consumer component retrieves an event bundle or aggregate data record and performs all the processing on this aggregate data record. The processing may comprise preparing a billing report or completing a billing action related to the aggregate data record. The processing may comprise comparing this and other aggregate data records to a predefined fraud pattern or template. If the aggregate data record(s) sufficiently match the predefined fraud pattern, the consumer component may take an action to mitigate possible fraud. For example the consumer component may automatically send a fraud notification to an administrator or fraud handling department of a telecommunications service provider. The processing may comprise archiving the aggregate data record in a data store. A fraud pattern may be a step change increase of international calling (e.g., a sudden increase in international calling).

In this way, raw event records are not duplicated in multiple copies, and therefore data storage resources are conserved (less memory is needed). Likewise, by handling the event records in a stream, in near real-time, fraud can be addressed promptly, thereby curtailing a fraud activity and saving money.

Figure 1:
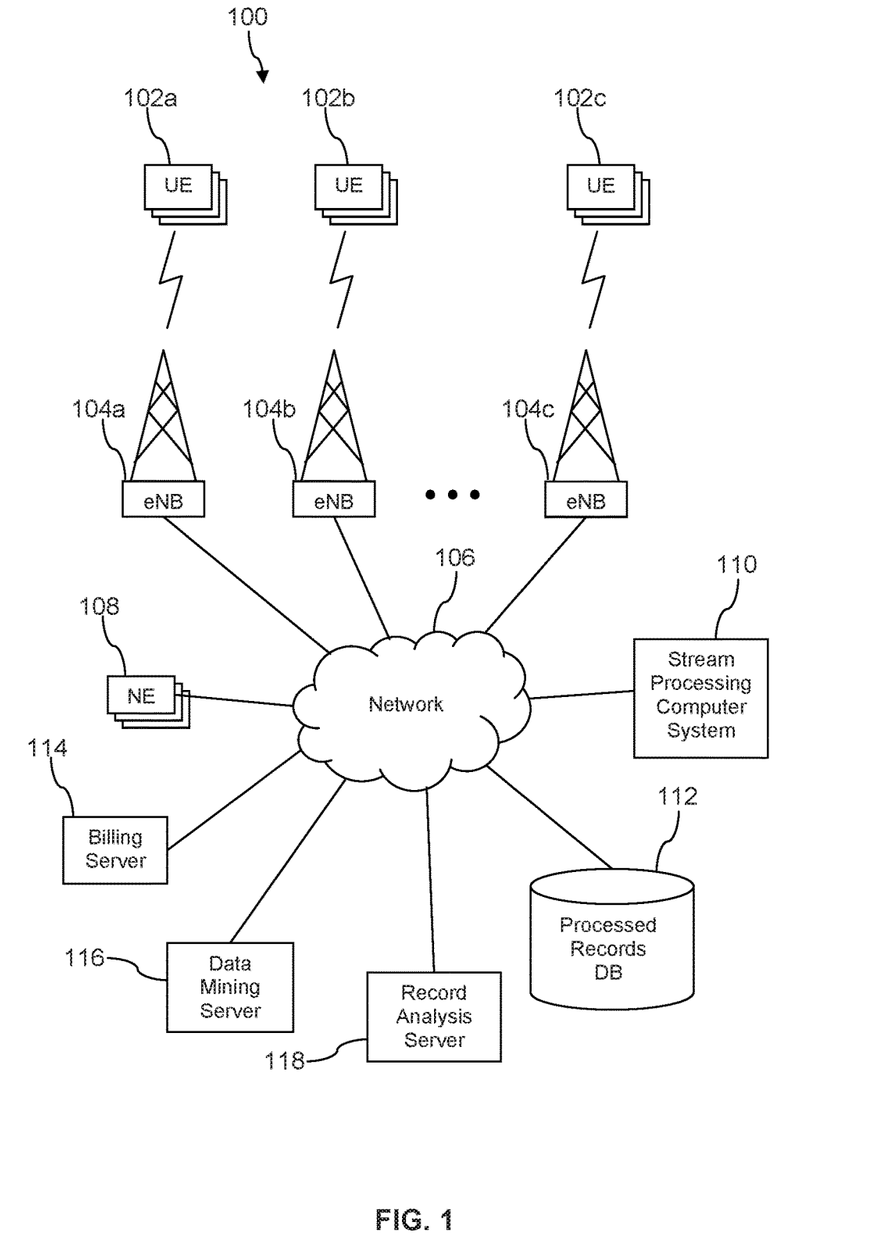
FIG. 1 is a block diagram of a communication system according to an embodiment of the disclosure.

Turning now to FIG. 1, a system 100 is described. In an embodiment, the system 100 comprises a plurality of user equipments (UEs) 102 (e.g., a first UE 102*a*, a second UE 102*b*, and a third UE 102*c*), a plurality of cell sites 104 (e.g., a first cell site 104*a*, a second cell site 104*b*, and a third cell site 104*c*), and a network 106. A UE 102 may receive wireless communication links from a cell site 104, and the cell site 104 may communicatively couple the UE 102 to the network 106 and therethrough to another UE 102 or to a host computer such as a content server, an application server, or another server that is communicatively coupled to the network. A UE 102 may be a mobile phone, a smart phone, a personal digital assistant (PDA), a wearable computer, a headset computer, a laptop computer, a tablet computer, or a notebook computer. The network 106 comprises one or more public networks, one or more private networks, or a combination thereof. The system 100 may comprise any number of UEs 102 and any number of cell sites 104.

The system 100 further comprises a plurality of network elements 108 that may be considered part of the network 106 but are shown separately because their role in the system 100 will be discussed further below. The network elements 108 may comprise routers, gateways, provisioning servers, switches, or other telecommunication electronic components. In some cases, the cell sites 104 may be considered network elements 108. The system 100 further comprises an event stream processing computer system 110, a processed records data store 112, a billing server 114, a data mining server 116, and a record analysis server 118 which may be implemented as one or more computer systems. Computer systems are discussed further hereinafter.

As the UEs 102 conduct communication activities, event records are generated by the network elements 108 and/or cell sites 104. Multiple different event records may be generated by the network elements 108 and/or cell sites 104 related to a single voice call or to a single data session of a UE 102. These event records may be transmitted by the network elements 108 and/or cell sites 104 via the network 106 to the event stream processing computer system 110. The event stream processing computer system 110 may process the event records, as described further below, and store processed records in the processed records data store 112. The billing server 114, the data mining server 116, and the record analysis server 118 may access the processed records data store 112 via the network 106 to perform other processing related to the processed records. For example, the billing server 114 may develop wireless communication service subscriber bills based on analyzing the processed records. The data mining server 116 may analyze the processed records to develop profiles of subscribers and to perform statistical analysis of performance of a wireless communication system. The record analysis server may perform other analysis of the processed records.

Figure 2:
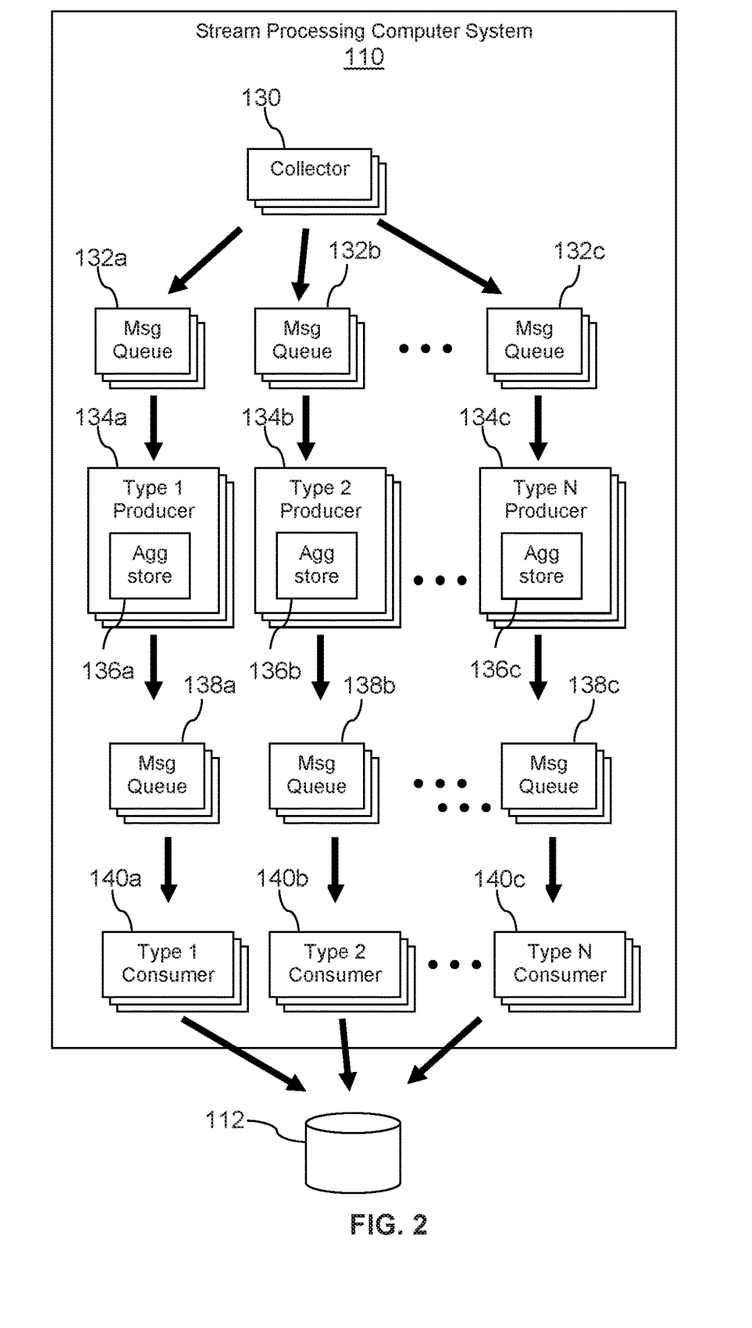
FIG. 2 is a block diagram of a real-time event stream processing computer system according to an embodiment of the disclosure.

Turning now to FIG. 2, further details of the event stream processing computer system 110 are described. It is understood that the event stream processing computer system 110 may be implemented as a plurality of computers or servers. In an embodiment, portions of the event stream processing computer system 110 may be implemented using cloud computing technology and/or architecture. The event stream processing computer system 110 comprises one or more collector components 130 that receive event records from network elements 108 and/or the cell sites 104. The event stream processing computer system 110 further comprises a plurality of message queues 132, a plurality of producer components 134, a plurality of aggregated data message queues 138, and a plurality of consumer components 140. The message queues 132 and aggregated message queues may be implemented on one or more server computers. The producer components 134 may be software, computer programs, or applications that execute on one or more server computers. The consumer components 140 may be software, computer programs, or applications that execute on one or more server computers.

The collector components 130 determine a type or category of a received event record and places the received event record on a message queue 132 that is associated with the subject type or category of event record. The collector components 130 may embed event records within a message before placing the created message embedding the event record on a messaging queue 132. For example, a first message queue 132a may be associated with a first type of event record, a second message queue 132b may be associated with a second type of event record, and a third message queue 132c may be associated with a third type of event record. In an embodiment, the event records may be Diameter event records. Diameter event records may belong to a variety of different types or category of event records. Some Diameter record types comprise Rf-type, Rx-type, Ro-type, Gy-type, and others. The collector components 130 may send event records associated with a specific Diameter record type to a message queue 132 associated with the same specific Diameter record type.

Each producer component 134 is configured to work on events of one category or type of event record, for example a first producer component 134a is configured to work on event records of a first type, a second producer component 134b is configured to work on event records of a second type, and a third producer component 134c is configured to work on event records of a third type. A producer component 134 comprises aggregates or bundles a plurality of event records associated with the same on-going telecommunication activity—for example a single voice call or a single data communication session—into a single event bundle or aggregated data record that is stored in an aggregation store 136. When the producer component 134 deems the subject on-going telecommunication activity to have completed, it removes the aggregated data record from its aggregation store 136 and places it on an aggregated data message queue 138. Each aggregated data message queue is associated with a different type of event records, and the producer component 134 places its aggregated data records on the aggregated data message queue 138 associated with the type of event records that the producer component 134 is configured to aggregate. For example, the first producer component 134a places its aggregated data records associated with the first type of event records on a first aggregated data message queue 138a, the second producer component 134b places its aggregated data records associated with the second type of event records on a second aggregated data message queue 138b, and the third producer component 134c places its aggregated data records associated with the third type of event records on a third aggregated data message queue 138c.

The consumer components 140 are configured to process a single type of event records and select from an aggregated data message queue 138 that aligns with its type of event record type. Thus, a first consumer component 140a configured to process event records of the first type selects from the first aggregated data message queue 138a, a second consumer component 140b configured to process event records of the second type selects from the second aggregated data message queue 138b, and a third consumer component 140c configured to process event records of the third type selects from the third aggregated data message queue 138c. The consumer components 140 retrieves an event bundle from the aggregated data message queue 138 and performs all the different steps of processing associated with that event bundle. This processing may comprise comparing this and other aggregate data records to a predefined fraud pattern or fraud template. If the aggregate data record(s) match the fraud pattern, the consumer component 140 takes appropriate action, such as sending notification to a fraud group or fraud administration task or mailbox. The processing may comprise performing billing analysis on the event bundle. The processing may comprise placing the event bundle in an archival storage.

In an embodiment, an application executing on the event stream processing computer system 110 may monitor the depth of the message queues 132 and the aggregated data message queues 138 and scale the computing resources allocated to the message queues 132 and to the aggregated data message queues 138, for example increasing computing resources when the queue depth exceeds a first threshold queue depth and decreasing computing resources when the queue depth drops below a second threshold queue depth. In an embodiment, an application executing on the event stream processing computer system 110 may monitor the processing load of the collector component(s) 130 and scale the computing resources allocated to the collector component(s) 130 accordingly, increasing the computing resources allocated to the collector component(s) 130 when the processing load is heavy and decreasing the computing resources allocated to the collector component(s) 130 when the processing load is light. In an embodiment, an application executing on the event stream processing computer system 110 may monitor the processing load of consumer components 140 and scale the computing resources allocated to the consumer components 140 accordingly, increasing computing resources allocated to the consumer components 140 when the processing burden on the consumer components 140 is high and decreasing the computing resources allocated to the consumer components 140 when the processing burden on the consumer components 140 is low. It is understood that the scaling may be done per event type.

Figure 3A:
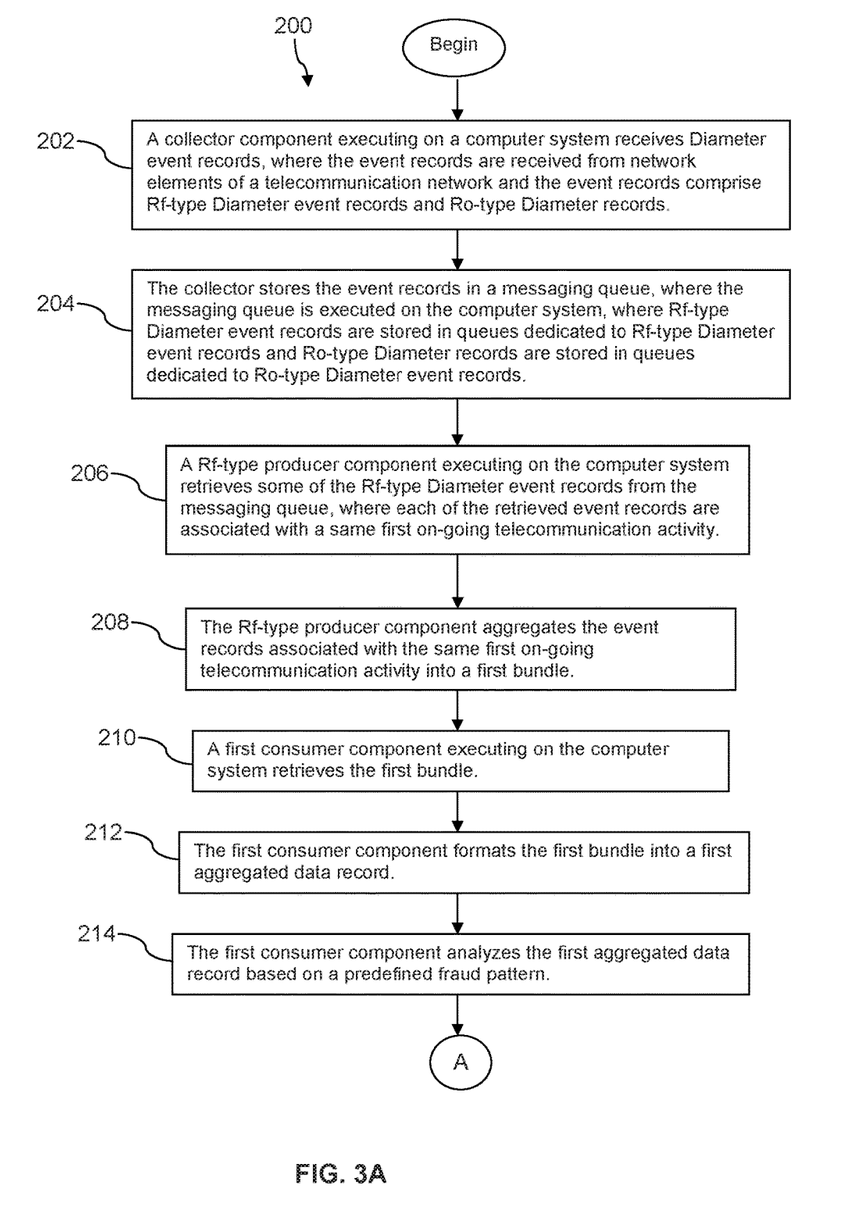
FIG. 3A and FIG. 3B is a flow chart of a method according to an embodiment of the disclosure.
Figure 3B:
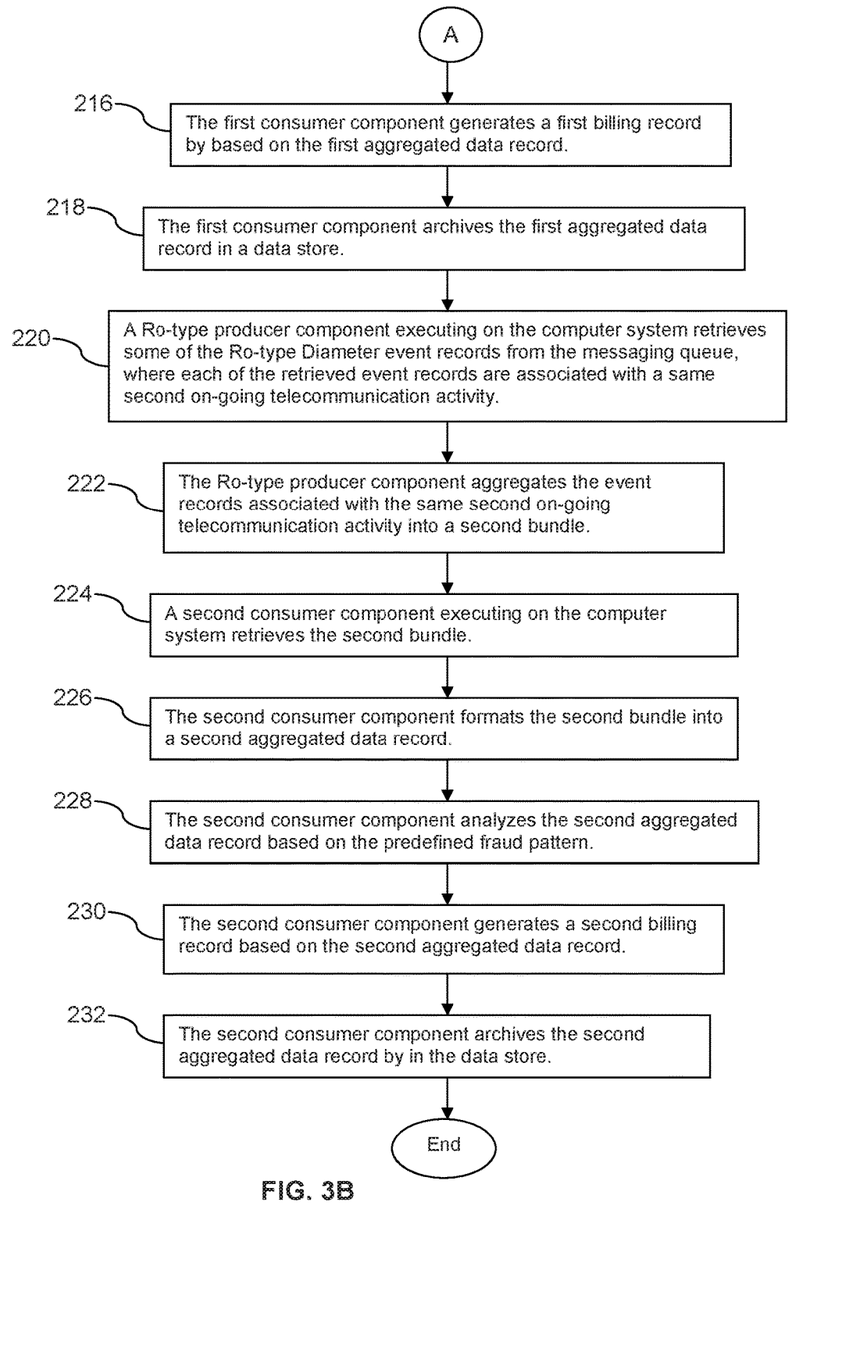

Turning now to FIG. 3A and FIG. 3B, a method 200 is described. At block 202, a collector component executing on a computer system receives Diameter event records, where the event records are received from network elements of a telecommunication network and the event records comprise Rf-type Diameter event records and Ro-type Diameter records. At block 204, the collector stores the event records in a Kafka messaging queue, where the messaging queue is executed on the computer system, where Rf-type Diameter event records are stored in queues dedicated to Rf-type Diameter event records and Ro-type Diameter records are stored in queues dedicated to Ro-type Diameter event records. At block 206, a Rf-type producer component executing on the computer system retrieves some of the Rf-type Diameter event records from the messaging queue, where each of the retrieved event records are associated with a same first on-going telecommunication activity.

At block 208, the Rf-type producer component aggregates the event records associated with the same first on-going telecommunication activity into a first bundle. At block 210, a first consumer component executing on the computer system retrieves the first bundle. At block 212, the first consumer component formats the first bundle into a first aggregated data record.

At block 214, the first consumer component analyzes the first aggregated data record based on a predefined fraud pattern. At block 216, the first consumer component generates a first billing record by based on the first aggregated data record. At block 218, the first consumer component archives the first aggregated data record in a data store.

At block 220, a Ro-type producer component executing on the computer system retrieves some of the Ro-type Diameter event records from the Kafka messaging queue, where each of the retrieved event records are associated with a same second on-going telecommunication activity. At block 222, the Ro-type producer component aggregates the event records associated with the same second on-going telecommunication activity into a second bundle.

At block 224, a second consumer component executing on the computer system retrieves the second bundle. At block 226, the second consumer component formats the second bundle into a second aggregated data record. At block 228, the second consumer component analyzes the second aggregated data record based on the predefined fraud pattern. At block 230, the second consumer component generates a second billing record based on the second aggregated data record. At block 232, the second consumer component archives the second aggregated data record by in the data store.

Figure 4:
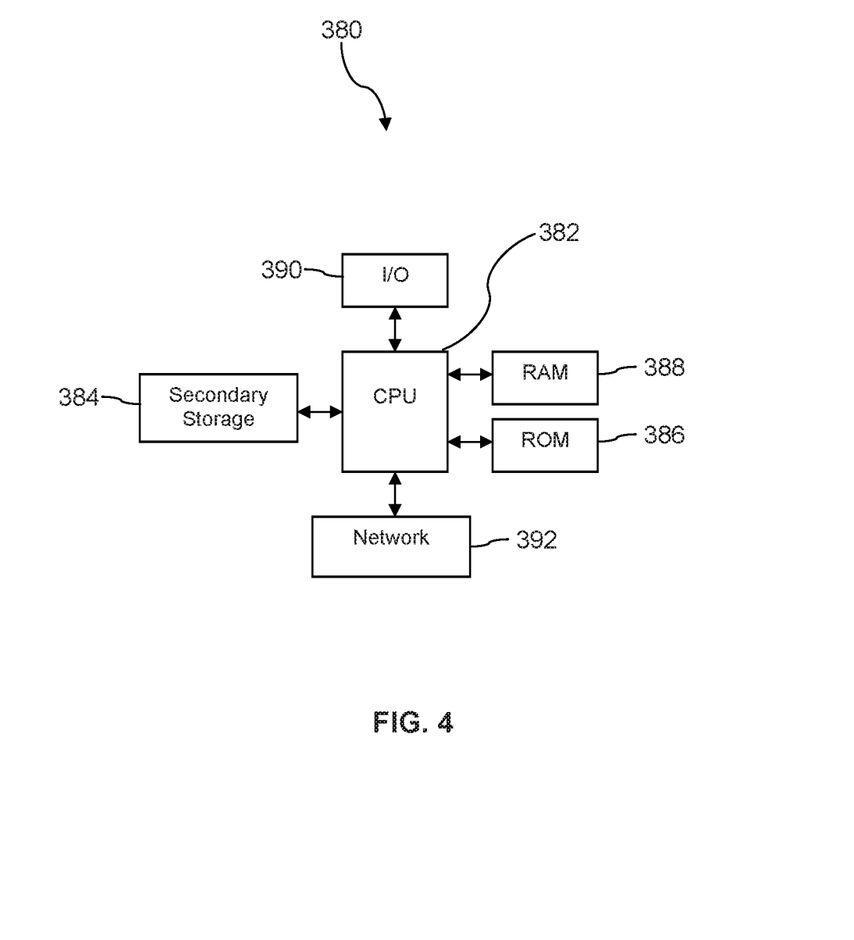
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of real-time streaming telecommunication event records, comprising:
    receiving Diameter event records by a collector component executing on a computer system, where the event records are received from network elements of a telecommunication network and the event records comprise Rf-type Diameter event records and Ro-type Diameter records;
    storing the event records in a messaging queue by the collector component, where the messaging queue is executed on the computer system, where Rf-type Diameter event records are stored in queues dedicated to Rf-type Diameter event records and Ro-type Diameter records are stored in queues dedicated to Ro-type Diameter event records;
    retrieving some of the Rf-type Diameter event records from the messaging queue by a Rf-type producer component executing on the computer system, where each of the retrieved event records are associated with a same first on-going telecommunication activity;
    aggregating the event records associated with the same first on-going telecommunication activity by the Rf-type producer component into a first bundle;
    retrieving the first bundle by a first consumer component executing on the computer system;
    formatting the first bundle by the first consumer component into a first aggregated data record;
    analyzing the first aggregated data record based on a predefined fraud pattern by the first consumer component;
    generating a first billing record by the first consumer component based on the first aggregated data record;
    archiving the first aggregated data record by the first consumer component in a data store;
    retrieving some of the Ro-type Diameter event records from the messaging queue by a Ro-type producer component executing on the computer system, where each of the retrieved event records are associated with a same second on-going telecommunication activity;
    aggregating the event records associated with the same second on-going telecommunication activity by the Ro-type producer component into a second bundle;
    retrieving the second bundle by a second consumer component executing on the computer system;
    formatting the second bundle by the second consumer component into a second aggregated data record;
    analyzing the second aggregated data record based on the predefined fraud pattern by the second consumer component;
    generating a second billing record by the second consumer component based on the second aggregated data record; and
    archiving the second aggregated data record by the second consumer component in the data store.

2. The method of claim 1, wherein the Diameter event records describe communication events associated with one of a mobile phone, a smart phone, a personal digital assistant (PDA), a wearable computer, a headset computer, a laptop computer, a notebook computer, a tablet computer, or a combination thereof.

3. The method of claim 1, wherein the network elements comprise one of a switch, a router, a cell site, a gateway, or a combination thereof.

4. The method of claim 1, further comprising:
    monitoring the depth of the messaging queue; and
    scaling the messaging queue based on the depth of the messaging queue.

5. The method of claim 4, further comprising:
    monitoring an in-flow rate of Diameter event records; and
    scaling the collector component based on the in-flow rate of Diameter event records.

6. The method of claim 5, further comprising:
    monitoring a processing load of the first consumer component; and
    scaling the first consumer component based on the processing load of the first consumer component.

7. The method of claim 5, further comprising:
    monitoring a processing load of the second consumer component; and
    scaling the second consumer component based on the processing load of the second consumer component.

* * * * *